(12) United States Patent
Furubayashi

(10) Patent No.: US 9,692,274 B2
(45) Date of Patent: Jun. 27, 2017

(54) MOTOR

(71) Applicant: NIDEC SANKYO CORPORATION, Nagano (JP)

(72) Inventor: Kazumi Furubayashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 257 days.

(21) Appl. No.: 14/291,163

(22) Filed: May 30, 2014

(65) Prior Publication Data

US 2014/0368063 A1  Dec. 18, 2014

(30) Foreign Application Priority Data

Jun. 12, 2013  (JP) .................................. 2013-123307

(51) Int. Cl.
| | |
|---|---|
| *H02K 1/28* | (2006.01) |
| *H02K 5/167* | (2006.01) |
| *H02K 37/12* | (2006.01) |
| *H02K 7/08* | (2006.01) |
| *H02K 5/04* | (2006.01) |
| *H02K 37/14* | (2006.01) |

(52) U.S. Cl.
CPC ............. *H02K 5/1672* (2013.01); *H02K 5/04* (2013.01); *H02K 7/08* (2013.01); *H02K 37/12* (2013.01); *H02K 37/14* (2013.01)

(58) Field of Classification Search
CPC ........ H02K 37/14; H02K 5/04; H02K 21/145; H02K 5/1672; H02K 7/08; H02K 7/083; H02K 37/12; H02K 1/28; H02K 7/10; H02K 3/46; H02K 3/52

USPC ........................................................... 310/49
See application file for complete search history.

(56) References Cited

U.S. PATENT DOCUMENTS

| | | | | |
|---|---|---|---|---|
| 4,438,361 A * | 3/1984 | Manson | ............... | H02K 5/1732 310/49.16 |
| 5,856,718 A * | 1/1999 | Matsushita | ............ | H02K 37/22 310/49.55 |
| 7,196,444 B2* | 3/2007 | Hata | ........................ | H02K 1/28 310/90 |
| 2011/0089781 A1* | 4/2011 | Yoneyama | ........... | H02K 1/2733 310/156.12 |

FOREIGN PATENT DOCUMENTS

| | | |
|---|---|---|
| JP | 2011078152 A | 4/2011 |
| JP | 2013-27185 A | 2/2013 |

* cited by examiner

*Primary Examiner* — Tran Nguyen
*Assistant Examiner* — Leda Pham
(74) *Attorney, Agent, or Firm* — Cantor Colburn LLP

(57) ABSTRACT

A motor may include a rotor having a permanent magnet on an outer peripheral face of a rotation shaft and a fixed body having a stator, an opposite-to-output side radial bearing member, and an opposite-to-output side end plate. The opposite-to-output side radial bearing member may be formed with a bearing part, a flange part, and a recessed part recessed toward an output side. An end part on the output side of the bearing part may be located on the output side relative to the end part on the opposite-to-output side of the stator, and an end part on the opposite-to-output side of the rotation shaft protruded toward the opposite-to-output side from the shaft hole may be accommodated in an inside of the recessed part and is located on the output side relative to the end part on the opposite-to-output side of the fixed body in the axial line direction.

16 Claims, 4 Drawing Sheets

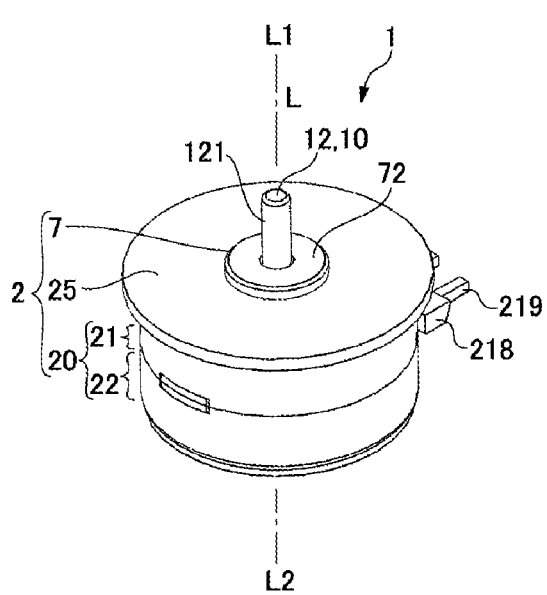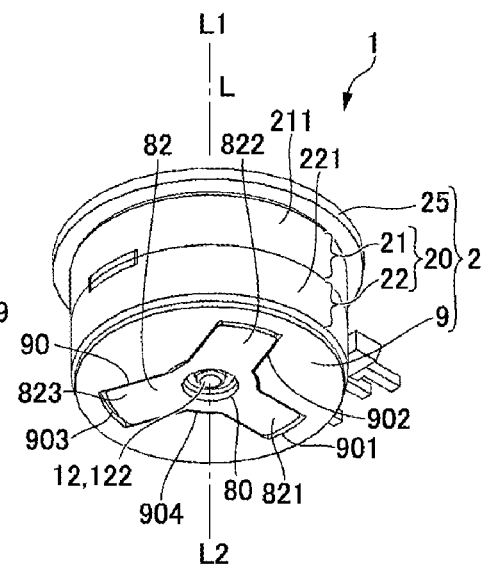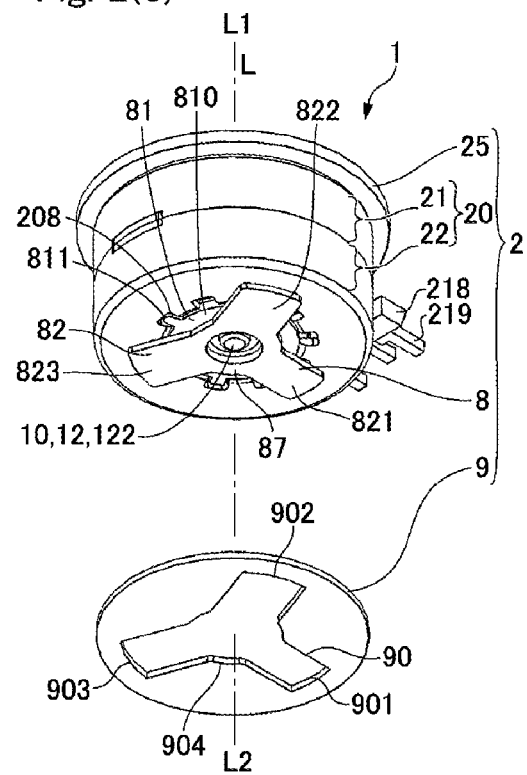

MOTOR

CROSS REFERENCE TO RELATED APPLICATION

The present invention claims priority under 35 U.S.C. §119 to Japanese Application No. 2013-123307 filed Jun. 12, 2013, the entire content of which is incorporated herein by reference.

FIELD OF THE INVENTION

At least an embodiment of the present invention may relate to a motor in which a rotation shaft of a rotor is supported by an opposite-to-output side radial bearing member.

BACKGROUND

A stepping motor includes a rotor having a permanent magnet on an outer peripheral face of a rotation shaft and a cylindrical stator in which a plurality of pole teeth facing an outer peripheral face of the permanent magnet are disposed in a circumferential direction. An opposite-to-output side radial bearing member supporting the rotation shaft is provided on an opposite-to-output side of the motor. As the opposite-to-output side radial bearing member, a type of stepping motor using a bearing member which supports a rotation shaft by a bottomed shaft hole has been known (see, Japanese Patent Laid-Open No. 2013-27185), and a type of stepping motor using a bearing member which supports a rotation shaft by a shaft hole formed of a through-hole (see, Japanese Patent Laid-Open No. 2011-78152). In the latter case, an end part on the opposite-to-output side of the rotation shaft is protruded to the opposite-to-output side from an end part on the opposite-to-output side of a motor main body.

In a stepping motor, a cylindrical-shaped moved member such as a gear may be fixed to a portion of a rotation shaft which is protruded from a stator toward the output side by press fitting from an end part on the output side. However, when the press fitting is to be performed, a large force toward the opposite-to-output side is applied to the rotation shaft. However, in the motor described in the former Patent Literature, a bearing member and a plate spring part are provided on the opposite-to-output side relative to an end part on the opposite-to-output side of the rotation shaft and thus the end part on the opposite-to-output side of the rotation shaft cannot be supported directly by a jig or the like. On the other hand, in the motor described in the latter Patent Literature, an end part on the opposite-to-output side of the rotation shaft can be directly supported by a jig or the like.

However, in the stepping motor described in the latter Patent Literature, the end part on the opposite-to-output side of the rotation shaft is protruded to the opposite-to-output side from an end part on the opposite-to-output side of a motor main body and thus a dimension in an axial line direction of the stepping motor is increased.

SUMMARY

In view of the problem described above, at least an embodiment of the present invention may advantageously provide a motor in which a dimension in the axial line direction of the motor can be shortened even when an end part on the opposite-to-output side of the rotation shaft is protruded to the opposite-to-output side from a shaft hole of an opposite-to-output side radial bearing member.

According to at least an embodiment of the present invention, there may be provided a motor including a rotor having a rotation shaft and a permanent magnet on an outer peripheral face of the rotation shaft, and a fixed body having a stator in a cylindrical shape which is disposed on an outer peripheral side with respect to the permanent magnet, an opposite-to-output side radial bearing member which rotatably supports the rotation shaft, and an opposite-to-output side end plate which holds the opposite-to-output side radial bearing member between the stator and the opposite-to-output side end plate. The opposite-to-output side radial bearing member is formed with a bearing part provided with a shaft hole which supports the outer peripheral face of the rotation shaft in a radial direction, a flange part which is protruded toward an outer side in the radial direction on an opposite-to-output side relative to the bearing part and is overlapped with an end part on the opposite-to-output side of the stator, and a recessed part which is recessed toward an output side from an end part on the opposite-to-output side of the opposite-to-output side radial bearing member. A bottom part of the recessed part is opened with the shaft hole. In addition, an end part on the output side of the bearing part is located on the output side relative to the end part on the opposite-to-output side of the stator in an axial line direction of the rotation shaft, and an end part on the opposite-to-output side of the rotation shaft is protruded toward the opposite-to-output side from the shaft hole in an inside of the recessed part and is located on the output side relative to the end part on the opposite-to-output side of the fixed body in the axial line direction.

In at least an embodiment of the present invention, a recessed part which is recessed toward the output side is formed at an end part on the opposite-to-output side of the opposite-to-output side radial bearing member, and an end part which is an end face on the opposite-to-output side of the rotation shaft is protruded toward the opposite-to-output side from a shaft hole in the inside of the recessed part. Therefore, the end part on the opposite-to-output side of the rotation shaft is located on the output side relative to the end part which is an end face on the opposite-to-output side of the fixed body. In addition, the end part which is an end face on the output side of a bearing part of the opposite-to-output side radial bearing member is located on the output side relative to the end part on the opposite-to-output side of the stator. Therefore, a dimension in the axial line direction of the motor is capable of being shortened. In this case, specifically, the end part on the opposite-to-output side of the fixed body is determined by an end part located at the most opposite-to-output side between the end part on the opposite-to-output side of the opposite-to-output side radial bearing member and the end part on the opposite-to-output side of the opposite-to-output side end plate. For example, it may be structured that the end part on the opposite-to-output side of the opposite-to-output side radial bearing member and the end part on the opposite-to-output side of the opposite-to-output side end plate are located at the same position as each other in the axial line direction.

In at least an embodiment of the present invention, the end part on the opposite-to-output side of the rotation shaft is formed in a flat face which is perpendicular to the axial line direction. According to this structure, when a moved member such as a gear is to be fitted to a portion of the rotation shaft which is protruded toward the output side from the stator, the end part on the opposite-to-output side of the rotation shaft can be directly supported in a stable state by a jig or the like.

In at least an embodiment of the present invention, a moved member which is integrally rotated with the rotation shaft is fitted to a portion of the rotation shaft protruded from the stator toward the output side. When such a structure is adopted, the moved member such as a gear is fitted to a portion of the rotation shaft which is protruded toward the output side from the stator. In this case, the end part on the opposite-to-output side of the rotation shaft is capable being directly supported by a jig or the like.

In at least an embodiment of the present invention, an end part on the opposite-to-output side of the permanent magnet is formed with a ring-shaped recessed part which is recessed toward the output side around the rotation shaft, and at least an end part on the output side of the bearing part is located on an inner side of the ring-shaped recessed part. According to this structure, a dimension in the axial line direction of the motor can be further shortened.

In at least an embodiment of the present invention, a bottom part of the ring-shaped recessed part and the end part on the output side of the bearing part are formed in a flat face which is perpendicular to the axial line direction, and a ring-shaped member is attached to the rotation shaft on an inner side of the ring-shaped recessed part.

In at least an embodiment of the present invention, the motor includes an urging member which urges the rotor toward the opposite-to-output side, and the ring-shaped member is contacted with the bottom part of the ring-shaped recessed part and the end part on the output side of the bearing part. According to this structure, a required sliding load can be applied to the rotor through the ring-shaped member by utilizing an urging force of the urging member. In this case, it may be structured that the ring-shaped member is made of resin and is press-fitted to the rotation shaft. For example, it may be structured that an output side face of the ring-shaped member is unable to slide on the bottom part of the ring-shaped recessed part and an opposite-to-output side face of the ring-shaped member is capable of sliding on the end part on the output side of the bearing part. Further, in a case that a thickness of the ring-shaped member is set to be smaller than a depth of the ring-shaped recessed part and a whole of the ring-shaped member is located on the inner side of the ring-shaped recessed part, increase of the dimension in the axial line direction of the motor is suppressed.

In at least an embodiment of the present invention, an area of the bottom part of the ring-shaped recessed part is wider than an area of the end part on the output side of the bearing part. According to this structure, the end part on the output side of the bearing part can be brought close to the bottom part of the ring-shaped recessed part and, even when a ring-shaped member for applying a sliding load to the rotor is provided between the bottom part of the ring-shaped recessed part and the end part on the output side of the bearing part, increase of the dimension in the axial line direction of the motor can be suppressed. In this case, it may be structured that an area on the opposite-to-output side face of the ring-shaped member which is contacted with the end part on the output side of the bearing part is equivalent to or less than an area of the end part on the output side of the bearing part. According to this structure, a sliding load occurred at a surface-contact portion in the axial line direction can be stabilized.

In at least an embodiment of the present invention, a plurality of pole teeth in the stator is disposed in a circumferential direction so as to face an outer peripheral face of the permanent magnet and, when a first sliding load which is a total sliding load applied to the rotor is "Ta", a detent torque acted on the rotor is "Td", and a dynamic torque acted on the rotor by the stator is "Te", the first sliding load "Ta", the detent torque "Td" and the dynamic torque "Te" satisfy a relationship shown by the following expression:

"Td"<"Ta"<"Te"

According to this structure, in a case that supplying of an exciting current to the stator is stopped for stopping the rotor at a predetermined position, even when a magnetic attraction force (detent torque) between the permanent magnet of the rotor and the pole teeth of the stator is applied to the rotor, the rotor is stopped at the predetermined position by the first sliding load. Therefore, accuracy of a stopping position of the rotor can be enhanced. Further, the first sliding load is smaller than the dynamic torque with which the rotor receives from the stator and thus driving and rotation of the rotor is performed without trouble.

In at least an embodiment of the present invention, when a second sliding load between the ring-shaped member and the bearing part in the first sliding load "Ta" is "Tb", the first sliding load "Ta", the second sliding load "Tb", the detent torque "Td" and the dynamic torque "Te" satisfy a relationship shown by the following expression:

"Td"<"Tb"<"Ta"<"Te"

According to this structure, another separate member is not required for occurring the second sliding load. Further, an opposite-to-output side face of the rotor and an output side face of the fixed body are contacted with each other in the axial line direction and thus a large sliding load is occurred and, in addition, the sliding load is stable. Therefore, the first sliding load applied to the rotor is capable of being surely set larger than the detent torque and set smaller than the dynamic torque.

In at least an embodiment of the present invention, the urging member is a coiled spring. According to this structure, its spring constant is small and thus a stable urging force can be generated. Therefore, the second sliding load is capable of being stably occurred.

In at least an embodiment of the present invention, the coiled spring is disposed between an output side bearing member which supports the rotation shaft on the output side relative to the permanent magnet and the permanent magnet. According to this structure, even when a coiled spring is added, increase of a dimension in the axial line direction of the motor can be suppressed.

In at least an embodiment of the present invention, the opposite-to-output side radial bearing member is formed with a disk part which is enlarged from an end part on the opposite-to-output side of the bearing part and is positioned in the radial direction with respect to the stator, the flange part is protruded toward an outer side in the radial direction from an end face on the opposite-to-output side of the disk part, the recessed part formed in the opposite-to-output side radial bearing member is structured of the bottom part which is an opposite-to-output side face of the bearing part and of an inner peripheral face of the disk part and an inner peripheral face of the flange part, and the end part on the opposite-to-output side of the rotation shaft is located in the inside of the recessed part. According to this structure, while the bearing part is positioned in the radial direction with respect to the stator through the disk part, the end part on the opposite-to-output side of the rotation shaft is located in the inside of the recessed part formed in the opposite-to-output side radial bearing member by the bottom part which is an opposite-to-output side face of the bearing part, the inner peripheral face of the disk part and the inner peripheral face of the flange part. Therefore, while suppressing increase of the dimension in the axial line direction of the motor, the motor is capable of being stably rotated.

In at least an embodiment of the present invention, the opposite-to-output side end plate is a flat plate which is formed with an opening part to which the flange part of the opposite-to-output side radial bearing member is fitted, the flange part of the opposite-to-output side radial bearing member is overlapped with an end part on the opposite-to-output side of the stator through the opening part of the opposite-to-output side end plate, and the opposite-to-output side end plate is fixed to the end part on the opposite-to-output side of the stator in a state that the opposite-to-output side end plate is overlapped with an end face on the opposite-to-output side of the disk part of the opposite-to-output side radial bearing member. According to this structure, the flange part of the opposite-to-output side radial bearing member is not required to overlap with the opposite-to-output side end plate and, alternatively, the opposite-to-output side end plate is not required to overlap with the flange part of the opposite-to-output side radial bearing member. Therefore, while suppressing increase of the dimension in the axial line direction of the motor, the opposite-to-output side radial bearing member is sandwiched between the opposite-to-output side end plate and the stator and is held in a non-movable state.

In at least an embodiment of the present invention, the motor includes an urging member which urges the rotor toward the opposite-to-output side, and a bottom part of the ring-shaped recessed part and an end part on the output side of the bearing part are formed in a flat face which is perpendicular to the axial line direction, and a ring-shaped member is provided on the rotation shaft between the bottom part of the ring-shaped recessed part and the end part on the output side of the bearing part for occurring a sliding load between the bearing part and the ring-shaped member. According to this structure, a required sliding load can be applied to the rotor through the ring-shaped member by utilizing an urging force of the urging member.

In at least an embodiment of the present invention, the opposite-to-output side radial bearing member is made of a resin molding whose main material is one of PBT (polybutylene terephthalate), LCP (liquid crystal polymer), PPS (polyphenylene sulfide), ABS (copolymer resin of acrylonitrile-butadiene-styrene), and PC (polycarbonate).

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2(a), 2(b) and 2(c) are perspective views showing an outward appearance and the like of a stepping motor in accordance with an embodiment of the present invention.

DETAILED DESCRIPTION OF THE PREFERRED EMBODIMENTS

A stepping motor will be described below with reference to the accompanying drawings. In a stepping motor, a side where a rotation shaft is protruded is referred to as an "output side "L1"" in a motor axial line direction "L" and an opposite side to the side where the rotation shaft is protruded is referred to as an "opposite-to-output side "L2"".

(Entire Structure)

Figure 1:
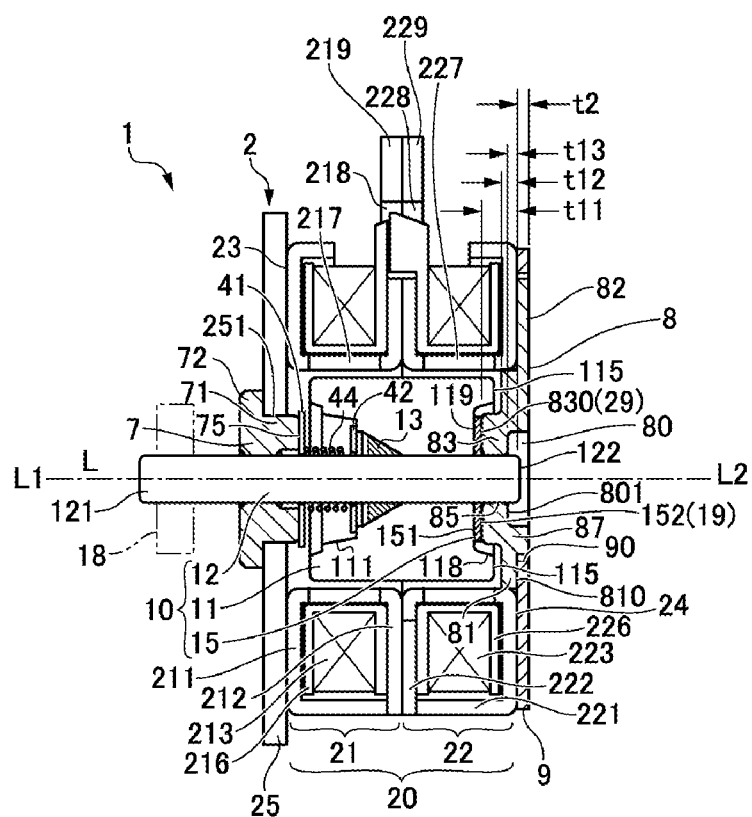
FIG. 1 is a cross-sectional view showing a stepping motor in accordance with an embodiment of the present invention.
Figure 3A:
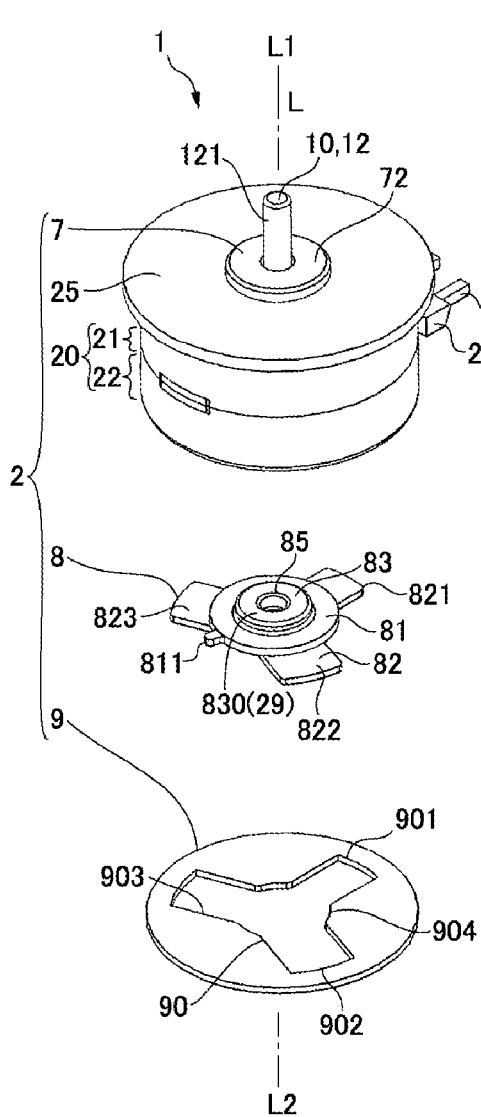
FIGS. 3(a) and 3(b) are exploded perspective views showing a stepping motor in accordance with an embodiment of the present invention.
Figure 3B:
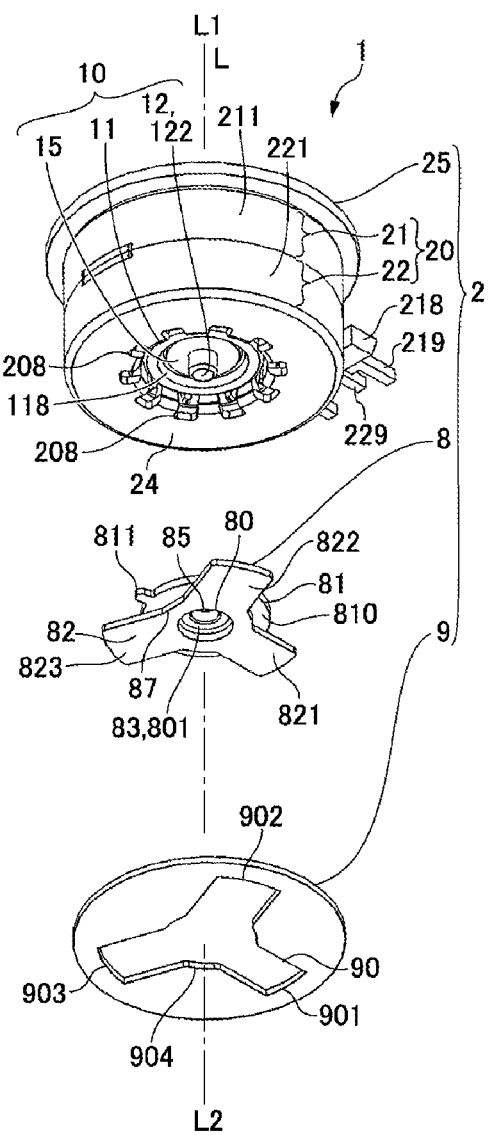
Figure 4:
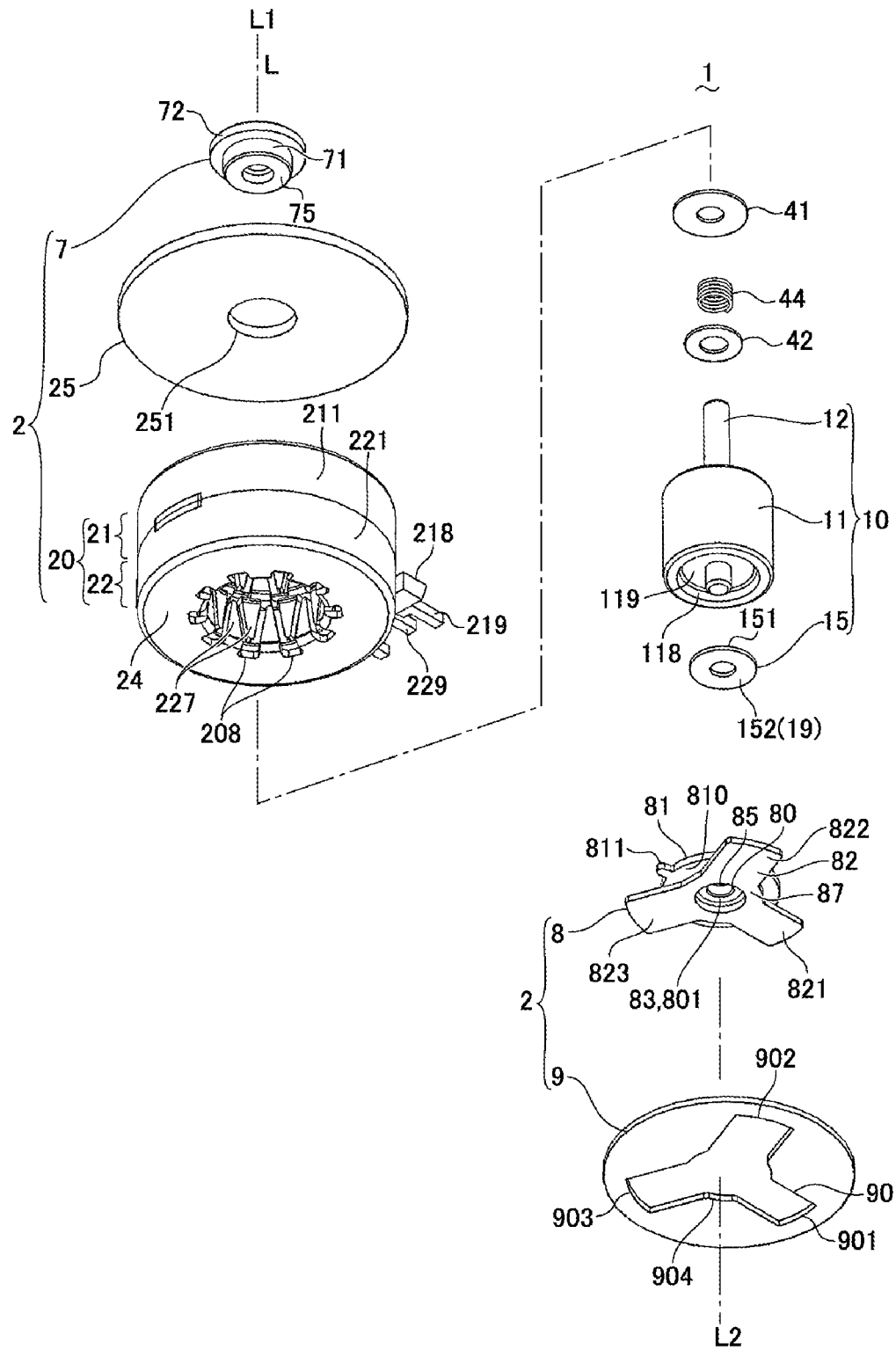
FIG. 4 is an exploded perspective view showing a state in which a rotor and the like are detached from a stepping motor in accordance with an embodiment of the present invention and which is viewed from an opposite-to-output side.

FIG. 1 is a cross-sectional view showing a stepping motor in accordance with an embodiment of the present invention. FIGS. 2(a), 2(b) and 2(c) are perspective views showing an outward appearance and the like of a stepping motor in accordance with an embodiment of the present invention. FIG. 2(a) is a perspective view showing a stepping motor which is viewed from an output side, FIG. 2(b) is its perspective view which is viewed from an opposite-to-output side, and FIG. 2(c) is a perspective view showing a state that an opposite-to-output side end plate is detached from a stepping motor and which is viewed from an opposite-to-output side. FIGS. 3(a) and 3(b) are exploded perspective views showing a stepping motor in accordance with an embodiment of the present invention. FIG. 3(a) is an exploded perspective view showing a state that an opposite-to-output side end plate and an opposite-to-output side radial bearing member are detached from a stepping motor and which is viewed from an output side, and FIG. 3(b) is its exploded perspective view which is viewed from an opposite-to-output side. FIG. 4 is an exploded perspective view showing a state in which a rotor and the like are detached from a stepping motor in accordance with an embodiment of the present invention and which is viewed from an opposite-to-output side.

As shown in FIGS. 1 through 4, a stepping motor 1 (motor) in this embodiment includes a rotor 10 having a permanent magnet 11 on an outer peripheral face of a rotation shaft 12 and a fixed body 2 having a cylindrical stator 20 which faces an outer peripheral face of the permanent magnet 11. An "N"-pole and an "S"-pole are alternately disposed on an outer peripheral face of the permanent magnet 11 in a circumferential direction. A portion 121 of the rotation shaft 12 which is protruded to the output side "L1" from the stator 20 is fixed with a cylindrical moved member 18 such as a gear by press fitting. An end face on the output side "L1" of the permanent magnet 11 is formed with a ring-shaped recessed part 111 having a stepped part which is opened while being enlarged toward the output side "L1" from an opposite-to-output side "L2" side so as to surround the rotation shaft 12. The permanent magnet 11 and the rotation shaft 12 are fixed to each other by an adhesive 13 which is applied to an inner side of the ring-shaped recessed part 111. In this embodiment, an end part 122 on the opposite-to-output side "L2" of the rotation shaft 12 is formed in a flat face perpendicular to an axial line direction "L".

The stator 20 includes a pair of stator assemblies 21 and 22 which are disposed so as to be superposed on each other in the axial line direction "L". The stator assemblies 21 and 22 respectively include coils 213 and 223 which are wound around insulators 216 and 226, and stator cores 211, 212, 221 and 222 which are disposed on both sides of the insulators 216 and 226 in the axial line direction "L". The stator core 211 is an outer stator core covering a face on an output side "L1" of the insulator 216 and the stator core 212 is an inner stator core covering a face on an opposite-to-output side "L2" of the insulator 216. The stator core 221 is an outer stator core covering a face on the opposite-to-output side "L2" of the insulator 226 and the stator core 222 is an inner stator core covering a face on the output side "L1" of the insulator 216. The stator cores 211 and 221 are formed in a "U"-shape in cross section and a motor case is structured of tube-shaped parts on the outer peripheral sides of the stator cores 211 and 221.

In the stator 20, respective stator cores 211, 212, 221 and 222 are provided with a plurality of pole teeth 217 and 227 which are stood up along inner peripheral faces of the insulators 216 and 226. In a state that the stator assembly 21 is structured, the pole teeth 217 formed in the stator core 211 are interposed between the pole teeth 217 formed in the stator core 212, and the pole teeth 217 formed in the stator core 211 and the pole teeth 217 formed in the stator core 212 are alternately disposed in a circumferential direction. Further, in a state that the stator assembly 22 is structured, the pole teeth 227 formed in the stator core 221 are interposed between the pole teeth 227 formed in the stator core 222, and the pole teeth 227 formed in the stator core 221 and the pole teeth 227 formed in the stator core 222 are alternately disposed in a circumferential direction.

Terminal blocks 218 and 228 are integrally formed with the insulators 216 and 226 and terminals 219 and 229 are fixed to the terminal blocks 218 and 228.

In the fixed body 2, an output side end plate 25 is fixed to an end part 23 on the output side "L1" of the stator 20 and an opposite-to-output side end plate 9 is fixed to an end part 24 on the opposite-to-output side "L2" of the stator 20. In this embodiment, the end part 23 on the output side "L1" of the stator 20 is formed of a circular ring-shaped part of the stator core 211 and the end part 24 on the opposite-to-output side "L2" of the stator 20 is formed of a circular ring-shaped part of the stator core 221.

(Bearing Structure on Output Side "L1")

In this embodiment, an output side radial bearing 7 which rotatably supports the rotation shaft 12 on the output side "L1" is held by utilizing the output side end plate 25 and the output side radial bearing 7 rotatably supports a portion of the rotation shaft 12 located on the output side "L1" relative to the permanent magnet 11. More specifically, a hole 251 is formed in the output side end plate 25 and the output side radial bearing 7 is held by the output side end plate 25 in a fitted state into the hole 251. The output side radial bearing 7 is provided with a tube part 71 which is fitted into the hole 251 and a flange part 72 which is enlarged from the tube part 71 on the output side "L1" and is provided with a larger diameter than the tube part 71. The output side radial bearing 7 is fixed to the output side end plate 25 by caulking an outer side edge of the tube part 71, which is further protruded to the opposite-to-output side "L2" relative to a face on the opposite-to-output side "L2" of the output side end plate 25, to a face on the opposite-to-output side "L2" of the output side end plate 25 in a state that a face on the opposite-to-output side "L2" of the flange part 72 is overlapped with a face on the output side "L1" of the output side end plate 25. The output side radial bearing 7 is made of an oil-impregnated sintered bearing.

(Bearing Structure on Opposite-to-Output Side "L2")

In this embodiment, an opposite-to-output side radial bearing 8 which rotatably supports the rotation shaft 12 on the opposite-to-output side "L2" is held by utilizing the opposite-to-output side end plate 9 and the opposite-to-output side radial bearing 8 rotatably supports a portion of the rotation shaft 12 which is located on the opposite-to-output side "L2" relative to the permanent magnet 11.

More specifically, the opposite-to-output side radial bearing member 8 is formed of a circular plate shaped bearing part 83 provided with a shaft hole 85, which supports an outer peripheral face of the rotation shaft 12 in a radial direction, and a flange part 82 which is protruded toward an outer side in the radial direction on the opposite-to-output side "L2" relative to the bearing part 83 and is overlapped with the end part 24 on the opposite-to-output side of the stator 20.

Further, the opposite-to-output side radial bearing member 8 is formed with a disk part 81 which is enlarged from an outer peripheral side end part on the opposite-to-output side "L2" of the circular plate shaped bearing part 83 and the flange part 82 is protruded from an end face 810 on the opposite-to-output side "L2" of the disk part 81 toward an outer side in the radial direction.

In this embodiment, the flange part 82 is formed of three rectangular plate parts 821, 822 and 823 which are protruded from an end face 810 on the opposite-to-output side "L2" of the disk part 81 toward an outer side in the radial direction. Inner side portions in the radial direction of the rectangular plate parts 821, 822 and 823 are connected with each other through a ring-shaped part 87 which is formed on the end face 810 on the opposite-to-output side "L2" of the disk part 81. In other words, the ring-shaped part 87 structures an inner peripheral portion of the flange part 82.

An outer diameter dimension of the disk part 81 located between the bearing part 83 and the flange part 82 is set to be slightly smaller than an inner diameter dimension of the stator 20. Therefore, when the rectangular plate parts 821, 822 and 823 of the flange part 82 formed in the opposite-to-output side radial bearing member 8 are superposed on the end part 24 on the opposite-to-output side "L2" of the stator 20, the disk part 81 is set in a state that the disk part 81 is inserted and press-fitted into an inner side of the end part on the opposite-to-output side "L2" of the stator 20. In other words, the opposite-to-output side radial bearing member 8 is positioned in the radial direction with respect to the stator 20 through the disk part 81 and, therefore, the bearing part 83 is positioned in the radial direction with respect to the stator 20 and the bearing part 83 is located on an inner side of the stator 20 on the output side "L1" relative to the disk part 81.

An outer circumferential edge of the disk part 81 is formed with a small protruded part 811 which is protruded toward an outer side in the radial direction at two positions in the circumferential direction. When the disk part 81 is fitted on an inner side of the stator 20, the protruded part 811 is fitted into a cut-out part 208 formed in a root portion of the pole teeth 227 of the stator core 221. Therefore, the opposite-to-output side radial bearing member 8 is positioned by the stator core 221 in the circumferential direction through the protruded part 811 which is provided in the disk part 81.

A circular recessed part 80 which is recessed toward the output side "L1" is formed at the center of an end face on the opposite-to-output side "L2" of the opposite-to-output side radial bearing member 8 structured as described above. Specifically, the recessed part 80 is formed of an inner peripheral face of the disk part 81 and an inner peripheral face of the flange part 82 (specifically, an inner peripheral face of the ring-shaped part 87). An inner diameter dimension of the recessed part 80 is set to be larger than an inner diameter dimension of the shaft hole 85. Therefore, the bearing part 83 is structured so that the shaft hole 85 formed of a through-hole is formed in a circular plate-shaped portion corresponding to a bottom part 801 of the recessed part 80 and the shaft hole 85 is opened toward the opposite-to-output side "L2" at the center of the bottom part 801 of the recessed part 80. In other words, the bottom part 801 (bottom face) of the recessed part 80 is structured of a face on the opposite-to-output side "L2" of the bearing part 83. Therefore, in this embodiment, the bearing part 83 means a portion of the opposite-to-output side radial bearing member 8 where the shaft hole 85 is formed. The position and the dimension in the axial line direction "L" of the bearing part 83 are determined by the position and the dimension of the region where the shaft hole 85 is formed in the opposite-to-output side radial bearing member 8. The opposite-to-output side radial bearing member is made of a resin molding whose main material is one of PBT (polybutylene terephthalate), LCP (liquid crystal polymer), PPS (polyphenylene sulfide), ABS (copolymer resin of acrylonitrile-butadiene-styrene), and PC (polycarbonate). In this embodiment, the opposite-to-output side radial bearing member 8 is a resin moulding made of PBT (polybutylene terephthalate), LCP (liquid crystal polymer), PPS (polyphenylene sulfide), ABS (copolymer resin of acrylonitrile-butadiene-styrene), PC (polycarbonate) or the like. In accordance with an embodiment of the present invention, a shape of the recessed part 80 is not limited to a circle but may be a rectangle.

The opposite-to-output side end plate 9 is formed of a flat plate in a circular plate shape whose outer diameter dimension is slightly smaller than an outer diameter dimension of the stator 20 and is formed with an opening part 90 into which the flange part 82 (rectangular plate parts 821, 822 and 823) and the ring-shaped part 87 of the opposite-to-output side radial bearing member 8 are fitted. Specifically, the opening part 90 is formed as one opening part in which rectangular opening parts 901, 902 and 903 into which the rectangular plate parts 821, 822 and 823 are fitted are connected with each other through a circular opening part 904 into which the ring-shaped part 87 is fitted. A portion of the opposite-to-output side end plate 9 which is located around the opening part 904 is overlapped with the end face 810 on the opposite-to-output side "L2" of the disk part 81 of the opposite-to-output side radial bearing member 8. Therefore, when an outer side edge of the opposite-to-output side end plate 9 is welded to the end part 24 which is an end face on the opposite-to-output side "L2" of the stator 20, the opposite-to-output side radial bearing member 8 is prevented from moving to the output side "L1" by abutting of the flange part 82 with the end part 24 on the opposite-to-output side "L2" of the stator 20. Further, the opposite-to-output side radial bearing member 8 is prevented from moving to the opposite-to-output side "L2" by abutting of the end face 810 on the opposite-to-output side "L2" of the disk part 81 with a face on the output side "L1" of the opposite-to-output side end plate 9. Therefore, the opposite-to-output side radial bearing member 8 is sandwiched between the opposite-to-output side end plate 9 and the stator 20 and is held in an unmovable state.

In this state, the end face on the opposite-to-output side "L2" of the opposite-to-output side radial bearing member 8 (specifically, the end face on the opposite-to-output side "L2" of the flange part 82) and the end face on the opposite-to-output side "L2" of the opposite-to-output side end plate 9 made of a flat plate are located at the same position as each other in the axial line direction "L". Therefore, in this case, both of the end face on the opposite-to-output side "L2" of the flange part 82 and the end face on the opposite-to-output side "L2" of the opposite-to-output side end plate 9 define the end part of the fixed body 2 which is the end face on the opposite-to-output side "L2" of the fixed body 2. Further, as shown in FIG. 1, the end part 830 which is the end face on the output side "L1" of the bearing part 83 is located on the output side "L1" by a dimension "t11" relative to the end part 24 on the opposite-to-output side "L2" of the stator 20 in the axial line direction "L". Further, a root portion of a protruded part structuring the bearing part 83 (face on the output side "L1" of the disk part 81) is located on the output side "L1" by a dimension "t12" relative to the end part 24 on the opposite-to-output side "L2" of the stator 20 in the axial line direction "L". Further, in the bearing part 83, an end part which is an end face on the opposite-to-output side "L2" of the shaft hole 85 (bottom part 801 of the recessed part 80) is located on the output side "L1" by a dimension "t13" relative to the end part 24 on the opposite-to-output side "L2" of the stator 20 in the axial line direction "L". Therefore, in this embodiment, the entire bearing part 83 (portion which forms the shaft hole 85) is located on the output side "L1" relative to the end part 24 on the opposite-to-output side "L2" of the stator 20 in the axial line direction "L".

Further, the end part 122 which is the end face on the opposite-to-output side "L2" of the rotation shaft 12 is protruded from the shaft hole 85 toward the opposite-to-output side "L2" in the recessed part 80 and is located on the output side "L1" by a dimension "t2" relative to the end part on the opposite-to-output side "L2" of the fixed body 2 (relative to the end part on the opposite-to-output side "L2" of the opposite-to-output side radial bearing member 8 and relative to the end part on the opposite-to-output side "L2" of the opposite-to-output side end plate 9) in the axial line direction "L". Therefore, the end part 122 on the opposite-to-output side "L2" of the rotation shaft 12 does not protrude to the opposite-to-output side "L2" from the end part on the opposite-to-output side "L2" of the fixed body 2. In this embodiment, the end part 122 on the opposite-to-output side "L2" of the rotation shaft 12 is located at the substantially same position as the end part 24 on the opposite-to-output side "L2" of the stator 20 in the axial line direction "L".

(Structure of Urging Member 44 and Ring-Shaped Member 15)

In the stepping motor 1 in accordance with this embodiment, an urging member 44 for urging the rotation shaft 12 to the opposite-to-output side "L2" is disposed between the output side radial bearing member 7 and the rotor 10. In this embodiment, the urging member 44 is made of a coiled spring and is disposed around the rotation shaft 12. In order to arrange the urging member 44 (coiled spring), in this embodiment, an end part on the opposite-to-output side "L2" of the urging member 44 is accommodated in an inside of the ring-shaped recessed part 111 of the permanent magnet 11. A ring-shaped washer 41 attached to the rotation shaft 12 is disposed between an end part on the output side "L1" of the urging member 44 and an end part 75 on the opposite-to-output side "L2" of the output side radial bearing 7, and a ring-shaped washer 42 attached to the rotation shaft 12 is disposed between an end part on the opposite-to-output side "L2" of the urging member 44 and a step part of the ring-shaped recessed part 111. Therefore, when the rotation shaft 12 is rotated, one or both of a portion between the washer 41 and the end part on the output side "L1" of the urging member 44 and a portion between the washer 42 and the end part on the opposite-to-output side "L2" of the urging member 44 serves as a sliding portion. In this embodiment, the washer 41 has a larger diameter than the washer 42. The washer 41 is fitted to the rotation shaft 12 in a movable state in the axial line direction "L". The washer 42 may be fitted to the rotation shaft 12 in a movable state in the axial line direction "L" and, alternatively, the washer 42 may be press-fitted to the rotation shaft 12 so as not to be able to move in the axial line direction "L". In this embodiment, the washers 41 and 42 are fitted to the rotation shaft 12 in a movable state in the axial line direction "L".

In the rotor 10 of the stepping motor 1 in this embodiment, a ring-shaped member 15 is attached to a portion of the rotation shaft 12 which is located between the permanent magnet 11 and the opposite-to-output side radial bearing 8. In order to arrange the ring-shaped member 15, a center of the end part 115 on the opposite-to-output side "L2" of the permanent magnet 11 is formed with a ring-shaped recessed part 118 around the rotation shaft 12 and the ring-shaped member 15 is disposed on an inner side of the ring-shaped recessed part 118. A thickness of the ring-shaped member 15 is set to be smaller than a depth of the ring-shaped recessed part 118 and thus the ring-shaped member 15 is located completely on an inner side of the ring-shaped recessed part 118 and does not protrude from the end part 115 on the opposite-to-output side "L2" of the permanent magnet 11.

An inner diameter dimension of the ring-shaped recessed part 118 of the permanent magnet 11 is larger than an outer diameter dimension of the end part 830 on the output side "L1" of the bearing part 83 of the opposite-to-output side radial bearing member 8 and the end part on the output side of the bearing part 83 of the opposite-to-output side radial bearing member 8 is located on the inner side of the ring-shaped recessed part 118 of the permanent magnet 11. Further, a bottom part 119 of the ring-shaped recessed part 118 is formed in a flat face perpendicular to the axial line direction "L" and the end part 830 on the output side "L1" of the bearing part 83 of the opposite-to-output side radial bearing member 8 is also formed in a flat face perpendicular to the axial line direction "L". Further, the rotor 10 is urged to the opposite-to-output side "L2" by the urging member 44. Therefore, the face 151 on the output side "L1" of the ring-shaped member 15 is contacted with the bottom part 119 of the ring-shaped recessed part 118 of the permanent magnet 11 and the face 152 on the opposite-to-output side "L2" of the ring-shaped member 15 is contacted with the end part 830 on the output side "L1" of the bearing part 83. A metal member may be used as the ring-shaped member 15 and a member made of resin may be used. In this embodiment, the ring-shaped member 15 is made of resin. In this embodiment, the outer diameter dimension of the ring-shaped member 15 is smaller than the inner diameter dimension of the ring-shaped recessed part 118 of the permanent magnet 11 and is smaller than the outer diameter dimension of the end part 830 on the output side "L1" of the bearing part 83 of the opposite-to-output side radial bearing member 8. Further, an area of the bottom part 119 of the ring-shaped recessed part 118 is larger than that of the end part 830 on the output side "L1" of the bearing part 83.

In the stepping motor 1 structured as described above, the face 151 on the output side "L1" of the ring-shaped member 15 is contacted with the bottom part 119 of the ring-shaped recessed part 118 of the permanent magnet 11 so as to be unable to slide, but the face 152 on the opposite-to-output side "L2" of the ring-shaped member 15 is slidable on the end part 830 on the output side "L1" of the bearing part 83 of the opposite-to-output side radial bearing member 8. Therefore, in this embodiment, a supported face 19 of the rotor 10 facing the opposite-to-output side "L2" in the axial line direction "L" is structured by the face 152 on the opposite-to-output side "L2" of the ring-shaped member 15, and a support face 29 of the fixed body 2 which slidably supports the supported face 19 of the rotor 10 on the opposite-to-output side "L2" with respect to the supported face 19 is structured by the end part 830 on the output side "L1" of the bearing part 83 of the opposite-to-output side radial bearing member 8.

The ring-shaped member 15 may be fitted to the rotation shaft 12 in a movable state in the axial line direction "L" and, alternatively, the ring-shaped member 15 may be press-fitted to the rotation shaft 12 so as not to be able to move in the axial line direction "L". In this embodiment, the ring-shaped member 15 is press-fitted and fixed to the rotation shaft 12 so as to be unable to move in the axial line direction "L".

(Sliding Load to Rotor 10)

In the stepping motor 1, the following sliding portions are existed between the fixed body 2 and the rotor 10. In other words, the sliding portions are a sliding portion between the end part 830 on the output side "L1" of the bearing part 83 of the opposite-to-output side radial bearing member 8 and the face 152 on the opposite-to-output side "L2" of the ring-shaped member 15 as the rotor 10, a sliding portion between the opposite-to-output side radial bearing 8 and the rotation shaft 12, a sliding portion between the output side radial bearing 7 and the rotation shaft 12, a sliding portion between the washer 41 and the end part on the output side "L1" of the urging member 44, and a sliding portion between the washer 42 and the end part on the opposite-to-output side "L2" of the urging member 44. As a result, a first sliding load "Ta" is applied to the rotor 10 in total.

In this embodiment, a sliding load (second sliding load "Tb") in the sliding portion between the end part 830 on the output side "L1" of the bearing part 83 of the opposite-to-output side radial bearing member 8 and the face 152 on the opposite-to-output side "L2" of the ring-shaped member 15 as the rotor 10 is smaller in comparison with the entire sliding load (first sliding load "Ta") which is a total sliding load applied to the rotor 10. Therefore, the first sliding load "Ta" and the second sliding load "Tb" satisfy the relationship shown by the following expression:

$$\text{the second sliding load "Tb"} < \text{the first sliding load "Ta"}$$

Further, in the stepping motor 1, a detent torque is acted between the rotor 10 and the pole teeth 217 and 227 of the stator 20 provided in the fixed body 2 according to the strength of flow when magnetic flux generated from the permanent magnet 11 flows to the stator 20. Further, when the rotor 10 is driven and rotated, a dynamic torque acts on the rotor 10 by a magneto-motive force generated from the stator 20.

Regarding the above-mentioned torques, in the stepping motor 1 in this embodiment, the first sliding load "Ta" is set to satisfy the relationship with respect to the detent torque "Td" and the dynamic torque "Te" as shown by the following expression:

$$\text{"Td"} < \text{"Ta"} < \text{"Te"}$$

In this embodiment, the first sliding load "Ta" and the second sliding load "Tb" satisfy the relationship as shown by the following expression:

$$\text{the second sliding load "Tb"} < \text{the first sliding load "Ta"}$$

Therefore, the first sliding load "Ta" and the second sliding load "Tb" are set to satisfy the relationship with respect to the detent torque "Td" and the dynamic torque "Te" as shown by the following expression:

"Td"<"Tb"<"Ta"<"Te"

(Principal Effects in this Embodiment)

As described above, in the stepping motor 1 in accordance with this embodiment, the opposite-to-output side radial bearing member 8 used in the fixed body 2 is formed with the bearing part 83 provided with the shaft hole 85, which supports an outer peripheral face of the rotation shaft 12 in the radial direction, the flange part 82 which is protruded toward an outer side in the radial direction on the opposite-to-output side "L2" relative to the bearing part 83 and is overlapped with the end part 24 on the opposite-to-output side "L2" of the stator 20, and the recessed part 80 which is recessed toward the output side "L1" from the end part on the opposite-to-output side "L2" of the opposite-to-output side radial bearing member 8, and the bottom part 801 of the recessed part 80 is opened with the shaft hole 85. Further, the end part 830 on the output side "L1" of the bearing part 83 is located on the output side "L1" relative to the end part 24 on the opposite-to-output side "L2" of the stator 20 in the axial line direction "L" of the rotation shaft 12. Further, the end part 122 on the opposite-to-output side "L2" of the rotation shaft 12 is protruded from the shaft hole 85 toward the opposite-to-output side "L2" in the inside of the recessed part 80 and is located on the output side "L1" relative to the end part on the opposite-to-output side "L2" of the fixed body 2 (relative to the end part on the opposite-to-output side "L2" of the opposite-to-output side radial bearing member 8 and relative to the end part on the opposite-to-output side "L2" of the opposite-to-output side end plate 9) in the axial line direction "L". Further, the end part 115 on the opposite-to-output side "L2" of the permanent magnet 11 is formed with the ring-shaped recessed part 118 which is recessed toward the output side "L1" around the rotation shaft 12 and at least the end part on the output side "L1" of the bearing part 83 is located on an inner side of the ring-shaped recessed part 118. Therefore, the dimension in the axial line direction "L" of the stepping motor 1 can be shortened.

Further, the end part 122 on the opposite-to-output side "L2" of the rotation shaft 12 is protruded toward the opposite-to-output side "L2" from the shaft hole 85 formed of a through hole which is opened in the bottom part of the recessed part 80 but does not further protrude to the opposite-to-output side "L2" from the end part (end face) on the opposite-to-output side "L2" of the opposite-to-output side radial bearing member 8. In other words, the end part 122 on the opposite-to-output side "L2" of the rotation shaft 12 is located in the inside of the recessed part 80 and is exposed when viewed from the opposite-to-output side "L2". Therefore, when a moved member 18 such as a gear is to be fitted to a portion 121 of the rotation shaft 12, which is protruded toward the output side "L1" from the stator 20, from an end part on the output side "L1" of the rotation shaft 12, the end part 122 on the opposite-to-output side "L2" of the rotation shaft 12 can be directly supported by a jig or the like. Further, the end part on the opposite-to-output side "L2" of the rotation shaft 12 is formed in a flat face perpendicular to the axial line direction "L". Therefore, the end part 122 on the opposite-to-output side "L2" of the rotation shaft 12 can be supported in a stable state by a jig or the like.

Further, the bottom part 119 of the ring-shaped recessed part 118 of the permanent magnet 11 and the end part 830 on the output side "L1" of the bearing part 83 of the opposite-to-output side radial bearing member 8 are formed in a flat face which is perpendicular to the axial line direction "L". Further, the rotor 10 is urged to the opposite-to-output side "L2" by the urging member 44. Therefore, the face 151 on the output side "L1" of the ring-shaped member 15 is abutted with the bottom part 119 of the ring-shaped recessed part 118 of the permanent magnet 11, and the face 152 on the opposite-to-output side "L2" of the ring-shaped member 15 is abutted with the end part 830 on the output side "L1" of the bearing part 83. Further, the supported face 19 of the rotor 10 facing the opposite-to-output side "L2" in the axial line direction "L" is structured by the face 152 on the opposite-to-output side "L2" of the ring-shaped member 15, and the support face 29 of the fixed body 2 which slidably supports the supported face 19 of the rotor 10 on the opposite-to-output side "L2" with respect to the supported face 19 is structured by the end part 830 on the output side "L1" of the bearing part 83 of the opposite-to-output side radial bearing member 8. In addition, the sliding load on the sliding faces (second sliding load "Tb"), the entire sliding load applied to the rotor 10 (first sliding load "Ta"), the detent torque "Td" and the dynamic torque "Te" are set to satisfy the relationship as shown by the following expression:

"Td"<"Tb"<"Ta"<"Te"

Therefore, in a case that supplying of an exciting current to the stator 20 is stopped for stopping the rotor 10 at a predetermined position, even when a magnetic attraction force (detent torque "Td") between the permanent magnet 11 of the rotor 10 and the pole teeth 217 and 227 of the stator 20 is applied to the rotor 10, the rotor 10 is not pulled by the detent torque "Td" in the circumferential direction and the rotor 10 is stopped at the predetermined position by the first sliding load "Ta". Accordingly, accuracy of a stopping position of the rotor 10 can be enhanced. As a result, resolution of a stopping position of the rotor 10 can be enhanced without increasing the number of poles of the stepping motor 1. Further, the first sliding load "Ta" is smaller than the dynamic torque "Te" with which the rotor 10 receives from the stator 20 and thus driving and rotation of the rotor 10 is performed without trouble.

In addition, in order to appropriately set the first sliding load "Ta", the urging member 44 which urges the rotor 10 to the opposite-to-output side "L2" is provided and the rotor 10 and the fixed body 2 are abutted with each other in the axial line direction "L". Therefore, a large second sliding load "Tb" is occurred between the rotor 10 and the fixed body 2 and, since the second sliding load "Tb" is a sliding load which is occurred in a surface-contact portion in the axial line direction "L", a level of the second sliding load "Tb" is large in comparison with the sliding loads occurred in other sliding portions. In other words, a sliding load (second sliding load "Tb") in the sliding portion between the end part 830 (support face 29) on the output side "L1" of the bearing part 83 of the opposite-to-output side radial bearing member 8 and the face 152 (supported face 19) on the opposite-to-output side "L2" of the ring-shaped member 15 as the rotor 10 is large in comparison with respective sliding loads of a sliding portion between the opposite-to-output side radial bearing member 8 and the rotation shaft 12, a sliding portion between the output side radial bearing member 7 and the rotation shaft 12, a sliding portion between the washer 41 and the end part on the output side "L1" of the urging member 44, and a sliding portion between the washer 42 and the end part on the opposite-to-output side "L2" of the urging member 44. Further, the second sliding load "Tb" which is occurred between the support face 29 and the supported face 19 is a sliding load occurred in a surface-contact portion in the axial line direction "L" and thus the second sliding load "Tb" is stable in comparison with the sliding loads occurred in other sliding portions. Therefore, the first sliding load "Ta" applied to the rotor 10 can be surely set larger than the detent torque "Td" and set smaller than the dynamic torque "Te".

Further, in this embodiment, the ring-shaped member 15 which is held by the rotation shaft 12 is provided in the rotor 10 on the opposite-to-output side "L2" relative to the permanent magnet 11 and the face 152 on the opposite-to-output side "L2" of the ring-shaped member 15 is utilized as the supported face 19. Therefore, the supported face 19 suitable to obtain a predetermined second sliding load "Tb" can be structured regardless of the materials and the diameters of the rotation shaft 12 and the permanent magnet 11.

Further, in this embodiment, the support face 29 is structured by the end part 830 of the bearing part 83 of the opposite-to-output side radial bearing member 8 which faces the output side "L1". Therefore, another separate member is not required to provide in the fixed body 2 for occurring the second sliding load "Tb". In addition, the area of the support face 29 in the opposite-to-output side radial bearing member 8 is large and thus the second sliding load "Tb" can be stably occurred. Further, when an oil-impregnated sintered bearing is used as the opposite-to-output side radial bearing member 8, the second sliding load "Tb" can be stably occurred.

Further, the urging member 44 is structured of a coiled spring and thus its spring constant is small. Therefore, a stable urging force can be generated and thus the second sliding load "Tb" can be stably occurred. Further, the urging member 44 (coiled spring) is disposed between the permanent magnet 11 and the output side radial bearing member 7 and thus, even when the urging member 44 is added, the size of the stepping motor 1 does not become so large.

Other Embodiments

In the embodiments described above, a coiled spring is used as the urging member 44 but a plate spring, a disc spring or the like may be used.

In the embodiments described above, the first sliding load "Ta" and the second sliding load "Tb" are set to satisfy the relationship with respect to the detent torque "Td" and the dynamic torque "Te" as shown by the following expression:

"Td"<"Tb"<"Ta"<"Te"

However, the first sliding load "Ta" and the second sliding load "Tb" may be set to satisfy the following relationship:

"Tb"≤"Td"<"Ta"<"Te"

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
a rotor comprising a rotation shaft and a permanent magnet on an outer peripheral face of the rotation shaft;
a fixed body comprising:
a stator in a cylindrical shape which is disposed on an outer peripheral side with respect to the permanent magnet;
an opposite-to-output side radial bearing member which rotatably supports the rotation shaft; and
an opposite-to-output side end plate which holds the opposite-to-output side radial bearing member between the stator and the opposite-to-output side end plate; and
an urging member which urges the rotor toward an opposite-to-output side;
wherein the opposite-to-output side radial bearing member comprises:
a bearing part provided with a shaft hole which supports the outer peripheral face of the rotation shaft in a radial direction;
a flange part which is protruded toward an outer side in the radial direction on the opposite-to-output side relative to the bearing part and is overlapped with an end part on the opposite-to-output side of the stator; and
a recessed part which is recessed toward an output side from an end part on the opposite-to-output side of the opposite-to-output side radial bearing member, a bottom part of the recessed part being opened with the shaft hole;
wherein an end part on the output side of the bearing part is located on the output side relative to the end part on the opposite-to-output side of the stator in an axial line direction of the rotation shaft;
wherein an end part on the opposite-to-output side of the rotation shaft is protruded toward the opposite-to-output side from the shaft hole in an inside of the recessed part and is located on the output side relative to the end part on the opposite-to-output side of the fixed body in the axial line direction;
wherein an end part on the opposite-to-output side of the permanent magnet is formed with a ring-shaped recessed part which is recessed toward the output side around the rotation shaft, and at least the end part on the output side of the bearing part is located on an inner side of the ring-shaped recessed part;
wherein a bottom part of the ring-shaped recessed part and the end part on the output side of the bearing part are formed in a flat face which is perpendicular to the axial line direction;
wherein a ring-shaped member is attached to the rotation shaft on an inner side of the ring-shaped recessed part, and the ring-shaped member is contacted with the bottom part of the ring-shaped recessed part and the end part on the output side of the bearing part;
wherein a plurality of pole teeth in the stator is disposed in a circumferential direction so as to face an outer peripheral face of the permanent magnet; and
wherein the rotor is structure such that when a first sliding load which is a total sliding load applied to the rotor is "Ta," a detent torque acted on the rotor is "Td", and a dynamic torque acted on the rotor by the stator is "Te", the first sliding load "Ta", the detent torque "Td", and the dynamic torque "Te" satisfy a relationship shown by the following expression:

"Td"<"Ta"<"Te".

2. The motor according to claim 1, wherein the end part on the opposite-to-output side of the rotation shaft is formed in a flat face which is perpendicular to the axial line direction.

3. The motor according to claim 2, further comprising a moved member which is fitted to a portion of the rotation shaft protruded from the stator toward the output side so as to be integrally rotated with the rotation shaft.

4. The motor according to claim 1, wherein the ring-shaped member is made of resin and is press-fitted to the rotation shaft.

5. The motor according to claim 1, wherein
a thickness of the ring-shaped member is set to be smaller than a depth of the ring-shaped recessed part, and
a whole of the ring-shaped member is located on the inner side of the ring-shaped recessed part.

6. The motor according to claim 1, wherein
an output side face of the ring-shaped member is unable to slide on the bottom part of the ring-shaped recessed part, and
an opposite-to-output side face of the ring-shaped member is capable of sliding on the end part on the output side of the bearing part.

7. The motor according to claim 1, wherein an area of the bottom part of the ring-shaped recessed part is wider than an area of the end part on the output side of the bearing part.

8. The motor according to claim 7, wherein an area on an opposite-to-output side face of the ring-shaped member which is contacted with the end part on the output side of the bearing part is equivalent to or less than an area of the end part on the output side of the bearing part.

9. The motor according to claim 1, wherein
the rotor is structured such that when a second sliding load between the ring-shaped member and the bearing part in the first sliding load "Ta" is "Tb", the first sliding load "Ta", the second sliding load "Tb", the detent torque "Td" and the dynamic torque "Te" satisfy a relationship shown by the following expression:

"Td"<"Tb"<"Ta"<"Te".

10. The motor according to claim 1, wherein the urging member is a coiled spring.

11. The motor according to claim 10, wherein the coiled spring is disposed between an output side bearing member which supports the rotation shaft on the output side relative to the permanent magnet and the permanent magnet.

12. The motor according to claim 1, wherein the end part on the opposite-to-output side of the fixed body is determined by an end part located at the most opposite-to-output side between the end part on the opposite-to-output side of the opposite-to-output side radial bearing member and the end part on the opposite-to-output side of the opposite-to-output side end plate.

13. The motor according to claim 12, wherein the end part on the opposite-to-output side of the opposite-to-output side radial bearing member and the end part on the opposite-to-output side of the opposite-to-output side end plate are located at the same position as each other in the axial line direction.

14. The motor according to claim 12, wherein
the opposite-to-output side radial bearing member is formed with a disk part which is enlarged from an end part on the opposite-to-output side of the bearing part and is positioned with respect to the stator in the radial direction,
the flange part is protruded toward an outer side in the radial direction from an end face on the opposite-to-output side of the disk part,
the recessed part formed in the opposite-to-output side radial bearing member is structured of the bottom part, which is an opposite-to-output side face of the bearing part, and of an inner peripheral face of the disk part and an inner peripheral face of the flange part, and
the end part on the opposite-to-output side of the rotation shaft is located in the inside of the recessed part.

15. The motor according to claim 14, wherein
the opposite-to-output side end plate is a flat plate which is formed with an opening part to which the flange part of the opposite-to-output side radial bearing member is fitted,
the flange part of the opposite-to-output side radial bearing member is overlapped with an end part on the opposite-to-output side of the stator through the opening part of the opposite-to-output side end plate, and
the opposite-to-output side end plate is fixed to the end part on the opposite-to-output side of the stator in a state that the opposite-to-output side end plate is overlapped with an end face on the opposite-to-output side of the disk part of the opposite-to-output side radial bearing member.

16. The motor according to claim 1, wherein the opposite-to-output side radial bearing member is made of a resin molding whose main material is one of PBT (polybutylene terephthalate), LCP (liquid crystal polymer), PPS (polyphenylene sulfide), ABS (copolymer resin of acrylonitrile-butadiene-styrene), and PC (polycarbonate).

* * * * *